(12) United States Patent
Sirotkin et al.

(10) Patent No.: US 9,467,926 B2
(45) Date of Patent: Oct. 11, 2016

(54) APPARATUS, METHOD, AND SYSTEM OF ESTABLISHING A CONNECTION BETWEEN A CELLULAR NODE AND A CORE NETWORK

(71) Applicant: INTEL IP CORPORATION, Santa Clara, CA (US)

(72) Inventors: Alexander Sirotkin, Giv'on Hachadasha (IL); Alexandre S. Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 70 days.

(21) Appl. No.: 14/582,879

(22) Filed: Dec. 24, 2014

(65) Prior Publication Data

US 2015/0312841 A1 Oct. 29, 2015

Related U.S. Application Data

(60) Provisional application No. 61/985,401, filed on Apr. 28, 2014.

(51) Int. Cl.
*H04W 40/24* (2009.01)

(52) U.S. Cl.
CPC .................... *H04W 40/246* (2013.01)

(58) Field of Classification Search
CPC .................................. H04W 40/246
USPC ......................................... 370/254
See application file for complete search history.

(56) References Cited

U.S. PATENT DOCUMENTS

| 2010/0272007 | A1 | 10/2010 | Shen et al. |
| 2010/0296448 | A1 | 11/2010 | Vainikka et al. |
| 2012/0082314 | A1 | 4/2012 | Fukuda |
| 2012/0155428 | A1 | 6/2012 | Bovo et al. |
| 2013/0064100 | A1 | 3/2013 | Bovo et al. |
| 2013/0083691 | A1* | 4/2013 | Murphy ............... H04W 12/06 370/254 |
| 2014/0106790 | A1 | 4/2014 | Kakinada et al. |

FOREIGN PATENT DOCUMENTS

| EP | 2575391 | 4/2013 |
| TW | 201322789 | 6/2013 |

(Continued)

OTHER PUBLICATIONS

International Search Report and Written Opinion for International Patent Application No. PCT/US2015/023223, mailed on Jun. 18, 2015, 13 pages.

(Continued)

*Primary Examiner* — Ronald B Abelson
(74) *Attorney, Agent, or Firm* — Shichrur & Co.

(57) ABSTRACT

Some demonstrative embodiments include devices, systems and/or methods of establishing a connection between a cellular node and a core network. For example, a first Evolved Node B (eNB) may include a cellular transceiver to communicate with a User Equipment (UE); an X2 interface to communicate with at least one second eNB; and a controller to send to the second eNB a first message including a core network node discovery request, to receive from the second eNB a second message including a core network node identifier, and to establish an S1 connection between the first eNB and a core network using the core network node identifier.

25 Claims, 3 Drawing Sheets

BEFORE

(56) References Cited

FOREIGN PATENT DOCUMENTS

| WO | 2014019777 | 2/2014 |
|---|---|---|
| WO | 2014057101 | 4/2014 |

OTHER PUBLICATIONS

3GPP TS 36.413 V12.1.0 (Mar. 2014); 3rd Generation Partnership Project; Technical Specification Group Radio Access Network; Evolved Universal Terrestrial Radio Access Network (E-UTRAN); S1 Application Protocol (S1AP) (Release 12); Mar. 2014; 285 pages.

3GPP TS 36.423 V12.1.0 (Mar. 2014); 3rd Generation Partnership Project; Technical Specification Group Radio Access Network; Evolved Universal Terrestrial Radio Access Network (E-TRAN); X2 application protocol (X2AP) (Release 12); Mar. 2014, 145 pages.

Office Action for Taiwanese Patent Application Serial No. 104108951, mailed on Aug. 29, 2016, 19 pages (Including 8 pages of English translation.).

\* cited by examiner

APPARATUS, METHOD, AND SYSTEM OF ESTABLISHING A CONNECTION BETWEEN A CELLULAR NODE AND A CORE NETWORK

CROSS REFERENCE

This application claims the benefit of and priority from U.S. Provisional Patent Application No. 61/985,401 entitled "X2 TUNNELING FOR RESILIENT ENB OPERATION", filed Apr. 28, 2014, the entire disclosure of which is incorporated herein by reference.

TECHNICAL FIELD

Some embodiments described herein generally relate to establishing a connection between a cellular node and a core network.

BACKGROUND

In a cellular network, a plurality of cellular nodes may be connected to a Core Network (CN) via a plurality of core network connections.

For example, in a Long Term Evolution (LTE) cellular network, a plurality of Evolved Node Bs (eNBs) may be connected to a core network via a plurality of backhaul connections, e.g., S1 connections.

In some circumstances, the backhaul connections between one or more of the cellular nodes and the core network may be disconnected, e.g., due to malfunction, sabotage, or disaster.

There is a need to provide a solution to a temporal or permanent disconnection of a cellular node from the core network.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figures 1A, 1B:
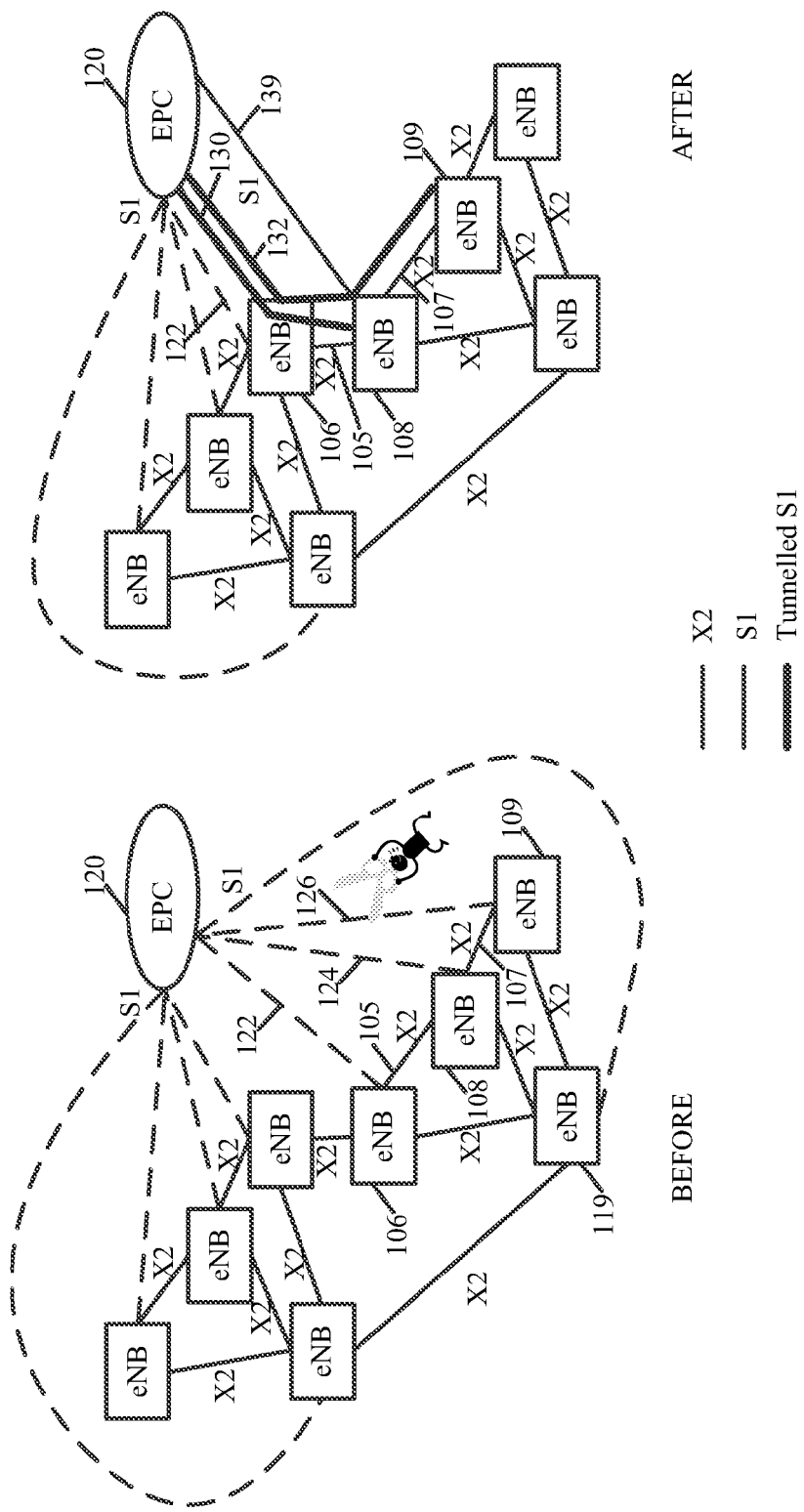
FIG. 1A is a schematic illustration of a cellular system, in accordance with some demonstrative embodiments.
FIG. 1B, is a schematic illustration of connections established between cellular nodes and a core network in the system of FIG. 1A, subsequent to disconnection of the cellular nodes from the core network, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a Smartphone device, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wireless node, a base station (BS), a wired or wireless router, a wired or wireless modem, a video device, an audio device, an audio-video (A/V) device, a wired or wireless network, a wireless area network, a cellular network, a cellular node, a cellular device, a Wireless Local Area Network (WLAN), a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Some embodiments may be used in conjunction with devices and/or networks operating in accordance with existing Long Term Evolution (LTE) specifications (including 3GPP TS 36.413 (3GPP TS 36.413 V12.1.0 (2014-03); *Technical Specification; 3rd Generation Partnership Proj-* ect; Technical Specification Group Radio Access Network; Evolved Universal Terrestrial Radio Access Network (E-UTRAN); S1 Application Protocol (S1AP) (Release 12)); and/or 3GPP 36.423 (3GPP TS 36.423 V12.1.0 (2014-03); Technical Specification; 3rd Generation Partnership Project; Technical Specification Group Radio Access Network; Evolved Universal Terrestrial Radio Access Network (E-UTRAN); X2 application protocol (X2AP); (Release 12))), and/or future versions and/or derivatives thereof, devices and/or networks operating in accordance with existing IEEE 802.16 standards (*IEEE-Std* 802.16, 2009 *Edition, Air Interface for Fixed Broadband Wireless Access Systems; IEEE-Std* 802.16e, 2005 *Edition, Physical and Medium Access Control Layers for Combined Fixed and Mobile Operation in Licensed Bands; amendment to IEEE Std* 802.16-2009, *developed by Task Group m*) and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1XRTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

Some demonstrative embodiments may be used in conjunction with a Heterogeneous Network (HetNet), which may utilize a deployment of a mix of technologies, frequencies, cell sizes and/or network architectures, e.g., including cellular, mmWave, and/or the like. In one example, the HetNet may include a radio access network having layers of different-sized cells ranging from large macrocells to small cells, for example, picocells and femtocells. Other embodiments may be used in conjunction with any other suitable wireless communication network.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

Reference is now made to FIG. 1A, which schematically illustrates a block diagram of a cellular system 100, in accordance with some demonstrative embodiments. In one example, cellular system 100 may include a $4^{th}$ generation cellular system such as, for example, a long term evolution (LTE) or LTE advance cellular system, a WiMAX cellular system, and the like. In other embodiments, system 100 may include any other cellular system.

As shown in FIG. 1, in some demonstrative embodiments, system 100 may include a plurality of cellular nodes, e.g., including cellular nodes 106, 108 and 109, capable of communicating content, data, information and/or signals corresponding to a plurality of cells. For example, node 106 may communicate with a plurality of User Equipment (UE) devices within a first cell, node 108 may communicate with a plurality of UE devices within a second cell, and/or node 109 may communicate with a plurality of UE devices within a third cell.

In some demonstrative embodiments, nodes 106, 108 and/or 109 may include an Evolved Node B (eNB). For example, nodes 106, 108 and/or 109 may be configured to perform radio resource management (RRM), radio bearer control, radio admission control (access control), connection mobility management, resource scheduling between UEs and eNB radios, e.g., Dynamic allocation of resources to UEs in both uplink and downlink, header compression, link encryption of user data streams, packet routing of user data towards a destination, e.g., another eNB or an Evolved Packet Core (EPC), scheduling and/or transmitting paging messages, e.g., incoming calls and/or connection requests, broadcast information coordination, measurement reporting, and/or any other operations.

In other embodiments, nodes 106, 108 and/or 109 may include any other functionality and/or may perform the functionality of any other cellular node, e.g., a Radio Network Controller (RNC), a Base Station (BS), and the like.

In some demonstrative embodiments, nodes 106, 108 and/or 109 may communicate with one or more cellular nodes of network 100 via one or more backhaul links. For example, node 108 may communicate with node 106 via a backhaul link (also referred to as "backhaul connection") 105, and/or node 109 may communicate with node 108 via a backhaul link 107.

In some demonstrative embodiments, nodes 106, 108 and 109 may communicate via backhaul links 105 and 107 according to an X2 Application Protocol (X2AP) signaling protocol, e.g., as described below. In other embodiments, nodes 106, 108 and/or 109 may communicate via backhaul links 105 and/or 107 according to any other signaling protocol.

In some demonstrative embodiments, backhaul links 105 and/or 107 may include wireless links. In other embodiments, backhaul links 105 and/or 107 may include a wired link, a fiber link, or any combination of wired, fiber and/or wireless links.

In some demonstrative embodiments, nodes 106, 108 and/or 109 may communicate with a core network (CN) 120 via one or more backhaul links (also referred to as "core network backhaul connections"). For example, node 108 may communicate with CN 120 via a backhaul link 122, node 108 may communicate with CN 120 via a backhaul link 124, and/or node 109 may communicate with CN 120 via a backhaul link 126.

In some demonstrative embodiments, nodes 106, 108 and 109 may communicate via backhaul links 122, 124, and/or 126 according to an S1 Application Protocol (S1AP) signaling protocol, e.g., as described below. In other embodiments, nodes 106, 108 and/or 109 may communicate via backhaul links 122, 124, and/or 136 according to any other signaling protocol.

Figure 2:
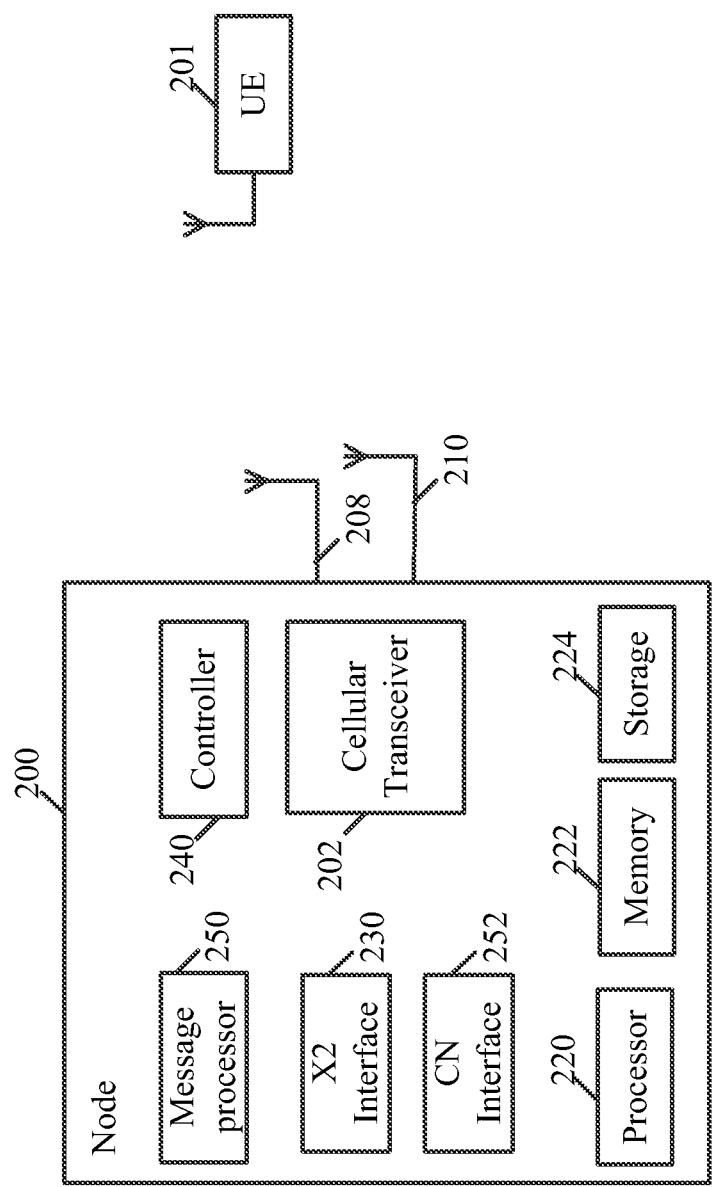
FIG. 2 is a schematic block diagram illustration of a cellular node, in accordance with some demonstrative embodiments.

Reference is made to FIG. 2, which schematically illustrates a cellular node 200, in accordance with some demonstrative embodiments. For example, cellular node 200 may perform the functionality of node 106 (FIG. 1), node 108 (FIG. 1), and/or node 109 (FIG. 1).

In some demonstrative embodiments, cellular node 200 may include an air interface, for example, a cellular transceiver (TRx) 202, configured to communicate with one or more UEs 201.

In some demonstrative embodiments, UE 201 may include, for example, a mobile computer, a MD, a STA, a laptop computer, a notebook computer, a tablet computer, an Ultrabook™ computer, a mobile internet device, a handheld computer, a handheld device, a storage device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a mobile phone, a cellular telephone, a PCS device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a video device, an audio device, an A/V device, a gaming device, a media player, a Smartphone, or the like.

In some demonstrative embodiments, cellular TRx 202 may include one or more wireless transmitters, receivers and/or transceivers able to send and/or receive wireless communication signals, RF signals, frames, blocks, transmission streams, packets, messages, data items, and/or data.

In some demonstrative embodiments, cellular TRx 202 may include a multiple input multiple output (MIMO) transmitters receivers system (not shown), which may be capable of performing antenna beamforming methods, if desired. In other embodiments, cellular TRx 202 may include any other transmitters and/or receivers.

In some demonstrative embodiments, cellular TRx 202 may include LTE, WCDMA and/or TD-SCDMA modulators and/or demodulators (not shown) configured to communicate downlink signals over downlink channels, e.g., between node 200 and a UE, and uplink signals over uplink channels, e.g., between a UE and node 200. In other embodiments, cellular TRx 202 may include any other modulators and/or demodulators.

In some demonstrative embodiments, cellular TRx 202 may include a turbo decoder and/or a turbo encoder (not shown) for encoding and/or decoding data bits into data symbols, if desired. In some demonstrative embodiments, cellular TRx 202 may include OFDM and/or SC-FDMA modulators and/or demodulators (not shown) configured to communicate OFDM signals over the downlink (DL) channels, and/or SC-FDMA signals over the uplink (UL) channels.

In some demonstrative embodiments, node 200 may include, or may be associated with, one or more antennas. In one example, node 200 may be associated with at least two antennas, e.g., antennas 208 and 210. In another example, node 200 may be associated with one antenna or more than two antennas.

In some demonstrative embodiments, antennas 208 and/or 210 may include any type of antennas suitable for transmitting and/or receiving wireless communication signals, blocks, frames, transmission streams, packets, messages and/or data. For example, antennas 208 and/or 210 may include any suitable configuration, structure and/or arrangement of one or more antenna elements, components, units, assemblies and/or arrays. For example, antennas 208 and/or 210 may include a phased array antenna, a dipole antenna, a single element antenna, a set of switched beam antennas, and/or the like.

In some embodiments, antennas 208 and/or 210 may implement transmit and receive functionalities using separate transmit and receive antenna elements. In some embodiments, antennas 208 and/or 210 may implement transmit and receive functionalities using common and/or integrated transmit/receive elements.

In some demonstrative embodiments, node 200 may include a backhaul interface 230 to communicate between node 200 and one or more other nodes via a backhaul link. For example, backhaul interface 230 may communicate between nodes 106 (FIG. 1) and 108 (FIG. 1), e.g., via backhaul link 105 (FIG. 1).

In some demonstrative embodiments, backhaul interface 230 may include an X2 interface. For example, node 200 may be a first eNB, and backhaul interface 230 may include an X2 interface to communicate with at least one second eNB, e.g., according to an X2AP. In other embodiments, backhaul interface 230 may include any other interface.

In some demonstrative embodiments, node 200 may include a core network interface 252 to communicate between node 200 and one or more elements of a core network, e.g., via one or more core network backhaul connections. In one example, node 200 may perform the functionality of node 106 (FIG. 1), and core network interface 252 may communicate between node 106 (FIG. 1) and CN 120 (FIG. 1), e.g., via backhaul link 122 (FIG. 1). In another example, node 200 may perform the functionality of node 108 (FIG. 1), and core network interface 252 may communicate between node 108 (FIG. 1) and CN 120 (FIG. 1), e.g., via backhaul link 124 (FIG. 1). In another example, node 200 may perform the functionality of node 109 (FIG. 1), and core network interface 252 may communicate between node 109 (FIG. 1) and CN 120 (FIG. 1), e.g., via backhaul link 126 (FIG. 1).

In some demonstrative embodiments, core network interface 252 may include an S1 interface, e.g., to communicate according to an S1AP. For example, node 200 may be an eNB, and core network interface 252 may include an S1 interface to communicate with core network 120 (FIG. 1) via a S1 connection. In other embodiments, core network interface 252 may include any other interface.

In some demonstrative embodiments, node 200 may include a controller 240 to control one or more functionalities of node 200 and/or to control one or more communications performed by node 200, for example, to control communications between nodes 106, 108 and/or 108 (FIG. 1), to control communications between node 200 and core network 120 (FIG. 1), and/or to control communications between node 200 and one or more other network elements, e.g., as described below.

In some demonstrative embodiments, controller 240 may include or may be implemented using circuitry and/or logic. For example, controller 240 may be implemented using controller circuitry and/or logic, one or more processors including circuitry, memory circuitry, and/or any other circuitry, which may be configured to perform at least part of the functionality of controller 240. Additionally or alternatively, one or more functionalities of controller 240 may be implemented by logic, which may be executed by a machine and/or one or more processors, e.g., as described below.

In some demonstrative embodiments, node 200 may include a message processor 250 configured to generate, process and/or access one or messages communicated by node 200.

In one example, message processor 250 may be configured to generate one or more messages to be sent by node 200, and/or message processor 250 may be configured to access and/or to process one or more messages received by node 200, e.g., as described below.

In some demonstrative embodiments, message processor 250 may include circuitry and/or logic, e.g., one or more processors including circuitry, memory circuitry, Media-Access Control (MAC) circuitry, Physical Layer (PHY) circuitry, and/or any other circuitry, configured to perform the functionality of message processor 250. Additionally or alternatively, one or more functionalities of message processor 250 may be implemented by logic, which may be executed by a machine and/or one or more processors, e.g., as described below.

In some demonstrative embodiments, at least part of the functionality of message processor 250 may be implemented as part of cellular transceiver 202, and/or at least part of the functionality of message processor 250 may be implemented as part of controller 240.

In other embodiments, the functionality of message processor 250 may be implemented as part of any other element of node 200.

In some demonstrative embodiments, cellular node 200 may include, for example, one or more of a processor 220, a memory unit 222, and a storage unit 224. In one example, one or more of processor, 220 memory 222 and/or storage 224 may be implemented as one or more elements separate from transceiver 202, and/or controller 240. In another example, one or more of processor, 220 memory 222 and/or storage 224 may be implemented as part of transceiver 202, and/or controller 240.

Processor 220 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 220 executes instructions, for example, of an Operating System (OS) of node 200 and/or of one or more suitable applications.

Memory unit 222 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 224 includes, for example, a hard disk drive, a floppy disk drive, a Compact Disk (CD) drive, a CD-ROM drive, a DVD drive, or other suitable removable or non-removable storage units. Memory unit 222 and/or storage unit 224, for example, may store data processed by node 200.

Referring back to FIG. 1A, in some circumstances, at least one backhaul connection ("the disconnected connection") between core network 120 and at least one cellular node ("the disconnected node"), e.g., cellular node 106 and/or cellular node 108, may be disconnected, e.g., due to malfunction, sabotage, disaster, or any other reason.

For example, as shown in FIG. 1A, the connection 124 between node 108 and CN 120 may be disconnected, and/or the connection 126 between node 109 and CN 120 may be disconnected.

In some demonstrative embodiments, the disconnected node may still have backhaul connectivity to at least one other cellular node, e.g., via a X2 connection. For example, node 108 may still be able to maintain connectivity to node 106 via backhaul connection 105, and/or to one or more other nodes via one or more other backhaul connections; and/or node 109 may be able to maintain connectivity to node 108 via backhaul connection 107, and/or to one or more other nodes via one or more other backhaul connections.

In some demonstrative embodiments, at least one cellular node of system 100 ("the connected node") may still have connectivity to the CN 120. For example, as shown in FIG. 1A, node 106 may still be connected to core network 120 via backhaul connection 122.

In some demonstrative embodiments, the nodes of system 100, e.g., nodes 106, 108 and/or 109, may be configured to enable the at least one disconnected node to discover the at least one connected node, which still has backhaul connectivity to the core network 120, e.g., as described below.

In some demonstrative embodiments, the nodes of system 100, e.g., nodes 106, 108 and/or 109, may be configured to enable establishing a new connection ("the new core network connection" or "the re-established core network connection"), for example, via a new route between the disconnected node and the core network 120, e.g., as described below.

In some demonstrative embodiments, the new core network connection may be established between the disconnected node and core network 120 based on information provided from at least one connected node to the disconnected node, e.g., as described below.

In some demonstrative embodiments, the new core network connection may be established in the form of a S1 connection (also referred to as "the re-configured S1 connection" or "the re-established S1 connection") between a disconnected eNB and the core network 120, e.g., via an eNB, which is till connected to core network 120, as described below.

In some demonstrative embodiments, the new core network connection may be established and routed at a transport layer, e.g., as described below.

In some demonstrative embodiments, the new core network connection may be established and routed at a 3GPP layer, for example, a X2 layer, e.g., as described below.

In some demonstrative embodiments, the new core network connection may be established by the disconnected node with core network 120, for example, when a transport network of system 100 may still be able to route Internet Protocol (IP) packets to core network 120, e.g., as described below.

In some demonstrative embodiments, the new core network connection may be established between the disconnected node and core network 120, for example, even if the transport network of system 100 is not able to route IP packets to core network 120, e.g., as described below.

In some demonstrative embodiments, the new core network connection may be established between the disconnected node and core network 120 via the connected node, e.g., as described below.

In some demonstrative embodiments, node 106 may enable an S1 connection between node 108 and core network, for example, by encapsulating S1AP messages of the S1 connection within X2AP messages, which may be communicated between nodes 106 and 108 over the X2 connection 105, and by communicating the S1AP messages of the S1 connection via a transport layer connection between node 106 and an MME in core network 120, e.g., as described below.

In some demonstrative embodiments, node 106 may enable an S1 connection between node 108 and core network, for example, by communicating with node 108 as if node 106 is an MME of core network 108, for example, by establishing an S1 connection between nodes 106 and 108; and by communicating with an MME in core network 120 as if node 106 is node 108, for example, via a transport layer connection between node 106 and the MME in core network 120, e.g., as described below.

Reference is also made to FIG. 1B, which schematically illustrates connections established between cellular nodes 108 and 109 and core network 120, subsequent to disconnection of the cellular nodes 108 and 109 from the core network 120, in accordance with some demonstrative embodiments.

In some demonstrative embodiments, as shown in FIG. 1B, node 108 may establish an S1 connection 130 to core network 120, for example, via node 106. In one example, S1 connection 130 may be established via the connection 105 between node 106 and node 108, and via the connection 122 between node 106 and core network 120, e.g., as described below.

In some demonstrative embodiments, as shown in FIG. 1B, node 108 may alternatively establish a new S1 connection 139 to core network 120, for example, to a new MME and/or using a new IP address of the same MME, e.g., as described below.

In some demonstrative embodiments, as shown in FIG. 1B, node 109 may establish an S1 connection 132 to core network 120, for example, via node 106. In one example, S1 connection 132 may be established via the connection 107 between node 109 and node 108, via the connection 105 between node 106 and node 108, and via the connection 122 between node 106 and core network 120, e.g., as described below.

In some demonstrative embodiments, establishing the connection 130 between node 108 and core network 120 and/or the connection 132 between node 109 and core network 120 may enable providing an efficient solution to re-connect the disconnected node to the core network, e.g., within a short time period, for example, to enable important, high-priority and/or critical communication within an evolved UMTS Terrestrial Radio Access Network (E-UTRAN) controlled by a disconnected eNB. This solution may be beneficial, for example, compared to a solution of having a movable backup Evolved Packet Core (EPC) Server to be moved to a location of the disconnected eNB, which may take hours to set up. In many scenarios, e.g., in a disaster scenario, critical communication within the first couple of hours may be crucial.

In some demonstrative embodiments, the connected node, which still has backhaul connectivity to core network 120, may not be aware of the fact that there may be one or more disconnected nodes, which have lost the backhaul connectivity to core network 120. Accordingly, the connected node may node be able to "proactively" inform the disconnected node that the connected node may be used to provide connectivity to core network 120.

In some demonstrative embodiments, node 108 may be configured to query one or more other nodes, for example, one or more neighboring nodes, e.g., node 106 and/or node 109, to discover whether or not the other nodes still have connectivity to core network 120, e.g., as described below.

In some demonstrative embodiments, node 108 may be configured to query the one or more other nodes regarding connectivity to core network 120, for example, when node 108 detects a loss of connectivity to core network 120, e.g., when a Stream Control Transmission Protocol (SCTP) connection, which may be used for a S1 connection to core network 120, fails.

In some demonstrative embodiments, nodes of system 100, e.g., nodes 106, 108, and/or 109, may be configured to communicate request messages, for example, core network node discovery requests, and response messages, for example, core network node discovery responses, to enable the disconnected node to query one or more other nodes for available network connectivity, and/or to enable one or more connected nodes to inform the disconnected node of one or more available options of connecting to core network 120, e.g., as described below.

In some demonstrative embodiments, controller 240 (FIG. 1) of node 108 may send to node 106 a first message including a core network node discovery request. For example, controller 240 (FIG. 2) of node 108 may cause message processor 250 (FIG. 2) of node 108 to generate the first message, and controller 240 (FIG. 2) of node 108 may cause X2 interface 230 (FIG. 2) of node 108 to send the first message to node 106, e.g., via X2 connection 105.

In some demonstrative embodiments, controller 240 (FIG. 2) of node 106 may receive from node 108 the first message including the core network node discovery request, and controller 240 (FIG. 2) of node 106 may send to node 108 a response, for example, a second message, including a core network node identifier representing a core network node. For example, controller 240 (FIG. 2) of node 106 may cause message processor 250 (FIG. 2) of node 106 to generate the second message, and controller 240 (FIG. 2) of node 106 may cause X2 interface 230 (FIG. 2) of node 106 to send the second message to node 108, e.g., via X2 connection 105.

In some demonstrative embodiments, the core network identifier may include an MME identifier, for example, configured to identify an MME of core network 120.

In some demonstrative embodiments, the MME identifier may include an Internet Protocol (IP) address of the MME. In other embodiments, the MME identifier may include, for example, a Globally Unique MME Identifier (GUMMEI), and/or any other address or identifier.

In some demonstrative embodiments, controller 240 (FIG. 2) of node 106 may include in the response the core network identifier of an MME to which node 106 may be connected, and/or another MME of core network 120, e.g., which may be available for connection.

In some demonstrative embodiments, controller 240 (FIG. 2) of node 106 may include in the response a plurality of core network identifiers, for example, if controller 240 (FIG. 2) of node 106 has potential connectivity to a plurality of MMEs in core network 120.

In some demonstrative embodiments, controller 240 (FIG. 2) of node 108 may receive the second message including the core network node identifier, and may establish an S1 connection between node 108 and core network 120 using the core network node identifier, e.g., as described below.

In some demonstrative embodiments, controller 240 (FIG. 2) of node 108 may send the first message to a plurality of nodes, for example, to node 106 and to one or more other nodes, e.g., to query the plurality of nodes for core network connectivity.

In some demonstrative embodiments, controller 240 (FIG. 2) of node 108 may send the first message to one or more nodes, e.g., each node, which may be connected to node 108, e.g., to node 106, node 109, and a node 119.

In some demonstrative embodiments, controller 240 (FIG. 2) of node 108 may receive one or more messages in response to the core network node discovery request.

In one example, controller 240 (FIG. 2) of node 108 may receive a response to the core network node discovery request from a node, e.g., node 106, which may still have connectivity to core network 120, while a response may not be received from a node, e.g., node 109 and/or node 119, not having connectivity to core network 120.

In some demonstrative embodiments, node 108 may receive two or more core network node discovery responses from two or more nodes. The two or more core network node discovery responses may include a plurality of core network node identifiers.

In some demonstrative embodiments, controller 240 (FIG. 2) of node 108 may select a core network identifier ("the selected core network identifier") from the plurality of core network node identifiers, and may establish the S1 connection with core network 120 using the selected core network node identifier.

In some demonstrative embodiments, controller 240 (FIG. 2) of node 108 may determine the selected core network identifier, for example, based on geographic locations of the core network nodes identified by the plurality of core network node identifiers, tracking areas of the plurality of core network node identifiers, and/or any other criteria.

In some demonstrative embodiments, the core network node discovery request may be communicated in the form of a dedicated X2AP backhaul connectivity request, and/or the core network node discovery response may be communicated in the form of a dedicated X2AP backhaul connectivity response. The X2AP backhaul connectivity response may include, for example, a MME IP address and, optionally, additional information.

In one example, the X2AP backhaul connectivity request may include a message sent from a first eNB, denoted $eNB_1$, to a second eNB, e.g., a neighboring eNB, denoted $eNB_2$, for example, to initiate backhaul connectivity discovery. For example, the X2AP backhaul connectivity request may include the following message:

TABLE 1

| IE/Group Name | Presence | Range | IE type and reference | Semantics description | Criticality | Assigned Criticality |
|---|---|---|---|---|---|---|
| Message Type | M | | 9.2.13 | | YES | reject |

In one example, the X2AP backhaul connectivity response may include a message sent from the $eNB_2$ the $eNB_2$, for example, to indicate that the $eNB_2$ has S1 connectivity. For example, the X2AP backhaul connectivity response may include the following message:

TABLE 2

| IE/Group Name | Presence | Range | IE type and reference | Semantics description | Criticality | Assigned Criticality |
|---|---|---|---|---|---|---|
| Message Type | M | | 9.2.13 | | YES | reject |
| MME Transport Layer Address | O | | Transport Layer Address 9.2.2.1 | | YES | ignore |
| GUMMEI | O | | 9.2.16 | | YES | ignore |

In some demonstrative embodiments, the disconnected node, e.g., node 108, may use the core network node identifier to establish a S1 connection directly with a MME in core network 120, e.g., as described below.

In some demonstrative embodiments, although the disconnected node, e.g., node 108, may have lost connectivity to core network 120, a transport network may still be able to route IP packets to an IP address ("the new IP address") identified by the core network identifier. for example, an IP address of a new MME or a new IP address of an "old" MME, e.g., an MME to which node 108 was previously connected.

In some demonstrative embodiments, in such a scenario, the disconnected node, e.g., node 108, may be able to setup an S1 connection with the new MME or the old MME using the new IP address, as indicated by the core network node discovery response, e.g., as received from node 106.

In some demonstrative embodiments, a first eNB ("eNB1"), e.g., node 108, may lose connection to an MME ("old MME") in core network 120. The eNB1, e.g., node 108, may request one or more neighboring eNBs to provide IP addresses of MMEs which are still accessible in core network 120, for example, by sending out one or more core network node discovery requests, e.g., as described above.

In some demonstrative embodiments, the eNB1 may receive one or more core network node discovery responses from one or more of the neighboring eNBs, e.g., from a second eNB ("eNB2"). The one or more core network node discovery responses may include one or more MME IP addresses, e.g., as described above.

In some demonstrative embodiments, the eNB1 may select an MME address to use for reestablishing the S1 connectivity to core network 120. For example, if a plurality of MME addresses are received, the eNB1 may determine the selected MME address by selecting an MME address from the plurality of MME addresses. Alternatively, if only one MME address is received, then eNB1 may determine the selected MME address to include the received MME address.

In some demonstrative embodiments, the eNB 1 may establish a transport layer connection, for example, a SCTP connection, with the selected MME.

In some demonstrative embodiments, the eNB1 may initialize a S1 connection with the selected MME, e.g., via the transport layer connection.

In some demonstrative embodiments, the S1 connection between the disconnected node, e.g., node 108, and core network 120, may be established via a second eNB, e.g., node 106, which may still have connectivity to core network 120, e.g., as described below.

In some demonstrative embodiments, nodes of system 100, e.g., nodes 106, 108 and/or 109, may be configured to encapsulate S1AP packets of an S1 connection within X2AP packets, e.g., as described below.

In some demonstrative embodiments, encapsulating the S1AP packets in the X2AP packets may enable establishing the S1 connection between the disconnected node and core network 120, for example, even in scenarios where the transport network may not be able to route IP packets to the new MME in core network 120.

In some demonstrative embodiments, the S1 connection may be established between a first eNB (eNB1), e.g., node 108, and an MME in the core network, e.g., core network 120, via a second eNB (eNB2), e.g., node 106.

In some demonstrative embodiments, the first and second eNBs, e.g., nodes 108 and 106, may communicate X2AP messages encapsulating S1AP messages of the S1 connection, and the second eNB, e.g., node 106, may communicate the S1AP messages with the MME over a transport layer between the second eNB and the MME, e.g., as described below.

In some demonstrative embodiments, node 108 may send to node 106 an X2AP message, e.g., an X2AP forward message, encapsulating an S1AP setup message to setup an S1 connection. For example, controller 240 (FIG. 2) of node 108 may cause message processor 250 (FIG. 2) of node 108 to encapsulate in an X2AP message, e.g., an X2AP FORWARD message, an S1AP SETUP message to request to setup an S1 connection with a core network node identified by a core network identifier, for example, an MME identifier to identify an MME, e.g., an MME IP address.

In one example, the X2AP Forward message may include a message sent from a first eNB to a second eNB to carry an encapsulated S1AP PPDU. For example, the X2AP Forward message may include the following message:

TABLE 3

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global eNB ID | M | | 9.2.1.37 | | YES | reject |
| GUMMEI | O | | 9.2.3.9 | This IE indicates the MME id | YES | ignore |
| S1AP PPDU | M | | OCTET STRING(2048) | | YES | reject |

In some demonstrative embodiments, controller 240 (FIG. 2) of node 106 may map the S1 connection requested by the S1AP SETUP message to a transport layer connection between node 106 and the network node, e.g., as described below.

In some demonstrative embodiments, controller 240 (FIG. 2) of node 106 may establish a new transport layer connection, e.g., a new SCTP connection, towards the MME indicated by the MME identifier in the X2AP message from node 108. Controller 240 (FIG. 2) of node 106 may maintain the mapping between the new SCTP connection and node 108.

In some demonstrative embodiments, controller 240 (FIG. 2) of node 106 may establish a SCTP connection dedicated to an eNB, e.g., to node 108.

In some demonstrative embodiments, controller 240 (FIG. 2) of node 106 may maintain a one-to-one mapping between SCTP connection to MME and eNB identifier, for example, for every eNB, which uses node 106 for backhaul connectivity to core network 120.

In some demonstrative embodiments, controller 240 (FIG. 2) of node 106 may establish a SCTP connection to communicate between a plurality of eNBs and a core network node.

In some demonstrative embodiments, for example, instead of establishing a new SCTP connection between node 106 and the MME, e.g., for every eNB which uses node 106 for backhaul connectivity, the S1AP may be enhanced, for example, such that an S1AP message may carry an eNB identifier of the eNB, e.g., node 108, which may be part of the S1 connection. The eNB identifier may be used by node 106 to route packets to the appropriate eNB.

In some demonstrative embodiments, controller 240 (FIG. 2) of node 108 may cause message processor 250 (FIG. 2) of node 108 to encapsulate in an X2AP message, e.g., an X2AP FORWARD message, an S1AP message to be sent over the S1 connection to the MME. The X2AP message may also include the core network identifier of the MME, e.g., the IP address or GUMMEI of the MME. Controller 240 (FIG. 2) of node 108 may send the X2AP message to node 106, e.g., via X2 connection 105.

According to this example, controller 240 (FIG. 2) of node 106 may receive the X2AP message, may extract the S1AP message from the X2AP message, and may route the S1AP message to the MME, e.g., according to the core network identifier included in the X2AP message.

In some demonstrative embodiments, controller 240 (FIG. 2) of node 106 may receive from the MME S1AP messages to be routed to one or more other eNBs, e.g., eNB 108. Controller 240 (FIG. 2) of node 106 may route the S1AP messages received from the MME to the appropriate eNB, e.g., to node 108, for example, based on the SCTP connection used to received the S1AP messages, for example, according to the mapping between the eNB and the SCTP connection. For example, controller 240 (FIG. 2) of node 106 may encapsulate the S1AP messages from the MME to be routed to node 108 within X2AP FORWARD messages, which may be send to node 108, e.g., via X2 connection 105.

In one example, node 108 may lose connection to the old MME, and may request one or more neighboring eNBs to provide IP addresses or GUMMEI of MMEs, which are still accessible in core network 120, for example, by sending out one or more core network node discovery requests, e.g., as described above.

According to his example, node 108 may receive one or more core network node discovery responses from one or more of the neighboring eNBs, for example, from node 106, e.g., as described above.

According to this example, node 108 may select an MME address to use for reestablishing the S1 connectivity to core network 120, e.g., as described above. For example, the selected MME address may include an MME address received from node 106.

According to this example, node 108 may establish a transport layer connection, for example, a SCTP connection, with the selected MME.

According to this example, node 108 may send to node 106 an S1AP SETUP message encapsulated in a X2AP FORWARD message. The S1AP setup message may include an MME identifier, e.g., the MME IP address, of the selected MME.

According to this example, node 106 may establish a new SCTP connection towards the MME indicated by the MME identifier in the X2AP message. Node 106 may remember the mapping between the SCTP connection and node 108, e.g., as described above.

According to this example, for every packet node 108 sends to new MME via node 106, node 108 may encapsulate the S1AP message into a X2AP FORWARD message carrying the MME identifier, and may send the X2AP FORWARD message to node 106.

According to this example, node 106 may extract the encapsulated S1AP message, and may forward the S1AP message to the MME indicated by MME identifier in X2AP FORWARD message.

In some demonstrative embodiments, the S1 connection between the disconnected node and the core network may be formed by a first S1 connection between the disconnected node and the connected node, and a second S1 connection between the connected node and the core network, e.g., as described below.

In some demonstrative embodiments, node 106 may be configured to "look like" an MME to node 108, and to "look like" node 108 to the new MME, e.g., as described below.

In some demonstrative embodiments, controller 240 (FIG. 2) of node 106 may be configured to send to node 108 the core network node discovery response including a core network identifier representing an address of node 106. For example, controller 240 (FIG. 2) of node 106 may be configured to send to node 108 the own IP address of node 106 as the core network identifier in the core network node discovery response. As a result, node 108 may select the IP address of node 106 as the selected MME, e.g., even without node 108 knowing that the selected MME is actual node 106.

In some demonstrative embodiments, node 108 may use the core network identifier in the core network node discovery response from node 106 to establish an SCTP connection between node 108 any the new "MME", e.g., without knowing that he new "MME" is actually node 106. From the point of view of node 108, normal S1AP initialization and message exchange may take place to establish the S1 connection with the new "MME", e.g., node 106.

In some demonstrative embodiments, when node 106 receives the S1 SETUP message from node 108, controller 204 (FIG. 2) of node 106 may establish a new transport layer connection, e.g., a SCTP connection, to an MME in core network 120. Controller 204 (FIG. 2) of node 106 may select an MME for node 108, for example, if node 106 is connected to multiple MMEs. In some demonstrative embodiments, controller 240 (FIG. 2) of node 106 may establish a SCTP connection dedicated to an eNB, e.g., to node 108.

In some demonstrative embodiments, controller 240 (FIG. 2) of node 106 may maintain a one-to-one mapping between the SCTP connection to MME and eNB identifier, for example, for every eNB, which uses node 106 for backhaul connectivity to core network 120. For example, each SCTP connection may be mapped to an MME IP address of an MME, and to an eNB identifier of the node for which the SCTP connection is to be used.

In some demonstrative embodiments, controller 240 (FIG. 2) of node 106 may establish a SCTP connection to communicate between a plurality of eNBs and an MME.

Controller 240 (FIG. 2) of node 106 may maintain a mapping between two SCTP connections, e.g., the SCTP connection from node 106 to the MME, and the SCTP connection from node 106 to another eNB, e.g., node 108.

In some demonstrative embodiments, controller 204 (FIG. 2) of node 106 may forward all S1AP messages, e.g., including S1 SETUP, based on the mapping between the two SCTP connections.

For example, controller 240 (FIG. 2) of node 106 may receive from node 106 an S1AP setup message addressed to node 106 as the "MME". Controller 240 (FIG. 2) of node 106 may setup an S1 connection between nodes 106 and 108, and may map the S1 connection to a SCTP connection between node 106 and a MME of core network 120. According to this example, controller 240 (FIG. 2) of node 106 may communicate an S1AP message with node 108 over the S1 connection, and may communicate the S1AP message with the MME via the SCTP connection.

Figure 3:
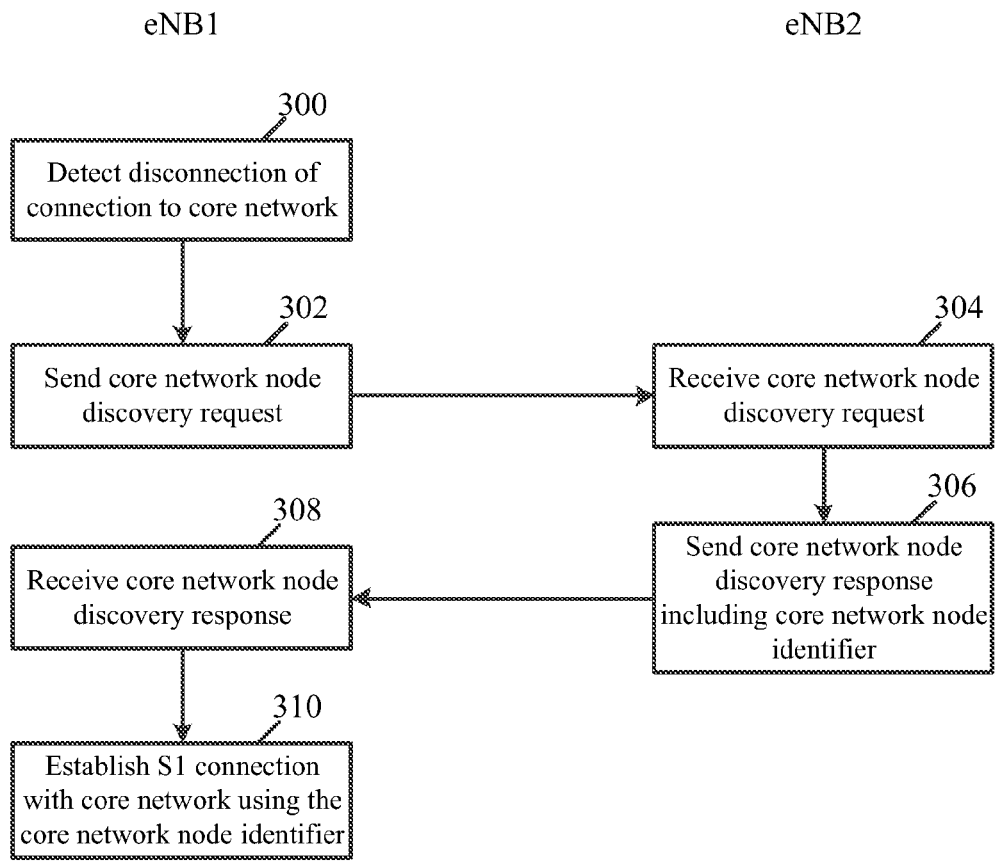
FIG. 3 is a schematic flow-chart illustration of a method of establishing a connection between a cellular node and a core network, in accordance with some demonstrative embodiments.

FIG. 3 is a schematic flow-chart illustration of a method of establishing a connection between a cellular node and a core network, in accordance with some demonstrative embodiments. In some demonstrative embodiments, one or more operations of the method of FIG. 3 may be performed by one or more elements of a system, e.g., system 100 (FIG. 1A), a cellular node, e.g., node 106 (FIG. 1), node 108 (FIG. 1), node 109 (FIG. 1), and/or node 200 (FIG. 2), and/or a controller, e.g., controller 240 (FIG. 2).

As indicated at block 302, the method may include sending from a first eNB to a second eNB a first message including a core network node discovery request. For example, controller 240 (FIG. 2) of node 108 (FIG. 1) may send the core network node discovery request to node 106 (FIG. 1) and/or one or more other nodes, e.g., as described above.

As indicated at block 300, the method may include detecting disconnection of a core network connection to a core network, and sending the core network node discovery request upon detecting the disconnection. For example, controller 240 (FIG. 2) of node 108 (FIG. 1) may send the core network node discovery request upon detecting disconnection of a backhaul connection between node 108 (FIG. 1) and core network 120 (FIG. 1), e.g., as described above.

As indicated at block 304, the method may include receiving the core network node discovery request at the second eNB. For example, node 106 (FIG. 1) may receive the core network node discovery request from node 108 (FIG. 1), e.g., as described above.

As indicated at block 306, the method may include sending from the second eNB to the first eNB a core network node discovery response including a core network node identifier representing a core network node. For example, controller 240 (FIG. 2) of node 106 (FIG. 1) may send to node 108 (FIG. 1) the core network node discovery response including at least one MME identifier, for example, MME IP address and/or GUMMEI, e.g., as described above.

As indicated at block 308, the method may include receiving the core network node discovery response at the first eNB. For example, node 108 (FIG. 1) may receive the core network node discovery response from node 106 (FIG. 1), e.g., as described above.

As indicated at block 310, the method may include establishing an S1 connection between the first eNB and the core network using the core network node identifier. For example, controller 240 (FIG. 2) of node 108 (FIG. 1) may establish the S1 connection with core network 120 (FIG. 1) using the MME IP address received from node 106 (FIG. 1), e.g., as described above.

Figure 4:
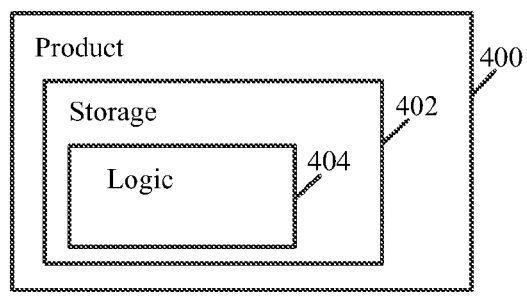
FIG. 4 is a schematic illustration of a product, in accordance with some demonstrative embodiments.

Reference is made to FIG. 4, which schematically illustrates a product of manufacture 400, in accordance with some demonstrative embodiments. Product 400 may include a non-transitory machine-readable storage medium 402 to store logic 404, which may be used, for example, to perform at least part of the functionality of a node, e.g., node 106 (FIG. 1), node 108 (FIG. 1), node 109 (FIG. 1), and/or node 200 (FIG. 2); a controller, e.g., controller 240 (FIG. 2); and/or a message processor, e.g., message processor 250 (FIG. 2); and/or to perform one or more operations of the method of FIG. 3. The phrase "non-transitory machine-readable medium" is directed to include all computer-readable media, with the sole exception being a transitory propagating signal.

In some demonstrative embodiments, product 400 and/or machine-readable storage medium 402 may include one or more types of computer-readable storage media capable of storing data, including volatile memory, non-volatile memory, removable or non-removable memory, erasable or non-erasable memory, writeable or re-writeable memory, and the like. For example, machine-readable storage medium 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a first Evolved Node B (eNB) comprising a cellular transceiver to communicate with a User Equipment (UE); an X2 interface to communicate with at least one second eNB; and a controller to send to the second eNB a first message including a core network node discovery request, to receive from the second eNB a second message including a core network node identifier, and to establish an S1 connection between the first eNB and a core network using the core network node identifier.

Example 2 includes the subject matter of Example 1, and optionally, comprising a core network interface to communicate with the core network, the controller to send the first message upon disconnection of the core network interface from the core network.

Example 3 includes the subject matter of Example 1 or 2, and optionally, wherein the controller is to send the first message to a plurality of second eNBs, to receive two or more second messages from two or more of the plurality of second eNBs, the two or more second messages including a plurality of core network node identifiers, and to establish the S1 connection with the core network using a selected core network node identifier of the plurality of core network node identifiers.

Example 4 includes the subject matter of any one of Examples 1-3, and optionally, wherein the controller is to communicate an X2 Application Protocol (X2AP) message between the first eNB and the second eNB, the X2AP message including the core network node identifier and encapsulating an S1 Application Protocol (S1AP) message of the S1 connection between the first eNB and the core network.

Example 5 includes the subject matter of Example 4, and optionally, wherein the X2AP message comprises an X2AP Forward message.

Example 6 includes the subject matter of any one of Examples 1-3, and optionally, wherein the S1 connection is over a transport layer connection.

Example 7 includes the subject matter of Example 6, and optionally, wherein the transport layer connection is a Stream Control Transmission Protocol (SCTP) connection.

Example 8 includes the subject matter of any one of Examples 1-7, and optionally, wherein the core network node identifier comprises a Mobility Management Entity (MME) identifier.

Example 9 includes the subject matter of Example 8, and optionally, wherein the MME identifier comprises an MME Internet Protocol (IP) address, or a Globally Unique MME Identifier (GUMMEI).

Example 10 includes the subject matter of any one of Examples 1-9, and optionally, wherein the first message comprises an X2 Application Protocol (X2AP) backhaul connectivity request, and the second message comprises an X2AP backhaul connectivity response.

Example 11 includes the subject matter of any one of Examples 1-10, and optionally, comprising one or more antennas, a memory, and a processor.

Example 12 includes a first Evolved Node B (eNB) comprising a core network interface to communicate with a core network; an X2 interface to communicate with at least one second eNB; and a controller to receive from the second eNB a core network node discovery request, and to send to the second eNB a response including a core network node identifier representing a core network node.

Example 13 includes the subject matter of Example 12, and optionally, wherein the controller is to receive from the first eNB a request to connect to the core network node, the controller to establish an S1 connection between the second eNB and the core network via the first eNB.

Example 14 includes the subject matter of Example 13, and optionally, wherein the controller is to communicate an X2 Application Protocol (X2AP) message between the first eNB and the second eNB, the X2AP message including the core network node identifier and encapsulating an S1 Application Protocol (S1AP) message of the S1 connection between the second eNB and the core network, the controller to communicate the S1AP message with the core network over a transport layer connection between the first eNB and the core network node.

Example 15 includes the subject matter of Example 14, and optionally, wherein the transport layer connection comprises a Stream Control Transmission Protocol (SCTP) connection between the first eNB and the core network node.

Example 16 includes the subject matter of Example 15, and optionally, wherein the controller is to establish the SCTP connection dedicated to the second eNB.

Example 17 includes the subject matter of Example 15, and optionally, wherein the controller is to establish the SCTP connection to communicate between a plurality of second eNBs and the core network node.

Example 18 includes the subject matter of any one of Examples 14-17, and optionally, wherein the X2AP message comprises an X2AP Forward message.

Example 19 includes the subject matter of Example 12 or 13, and optionally, wherein the core network node identifier comprises an address of the first eNB.

Example 20 includes the subject matter of Example 19, and optionally, wherein the controller is to receive an S1 Application protocol (S1AP) setup message from the second eNB, the S1AP setup message addressed to the first eNB, the controller to setup an S1 connection between the first eNB and the second eNB, to map the S1 connection to a Stream Control Transmission Protocol (SCTP) connection between the first eNB and a Mobility Management Entity (MME) of the core network, to communicate an S1AP message with the second eNB over the S1 connection, and to communicate the S1AP message with the MME via the SCTP connection.

Example 21 includes the subject matter of Example 20, and optionally, wherein the controller is to establish the SCTP connection dedicated to the second eNB.

Example 22 includes the subject matter of Example 20, and optionally, wherein the controller is to establish the SCTP connection to communicate between a plurality of second eNBs and the core network node.

Example 23 includes the subject matter of any one of Examples 12-22, and optionally, wherein the core network node identifier comprises a Mobility Management Entity (MME) identifier.

Example 24 includes the subject matter of any one of Examples 12-23, and optionally, comprising one or more antennas, a memory, and a processor.

Example 25 includes a first Evolved Node B (eNB) comprising a core network interface to communicate with a core network; an X2 interface to communicate with at least one second eNB; and a controller to establish an S1 connection between the second eNB and a core network node of the core network via the first eNB, the controller to communicate an X2 Application Protocol (X2AP) message between the first eNB and the second eNB, the X2AP message including a core network node identifier of the core network node and encapsulating an S1 Application Protocol (S1AP) message of the S1 connection between the second eNB and the core network node.

Example 26 includes the subject matter of Example 25, and optionally, wherein the controller is to receive from the second eNB a core network node discovery request, and to send to the second eNB a response including a core network node identifier of the core network node.

Example 27 includes the subject matter of Example 26, and optionally, wherein the core network node identifier comprises a Mobility Management Entity (MME) identifier.

Example 28 includes the subject matter of Example 27, and optionally, wherein the MME identifier comprises an MME Internet Protocol (IP) address, or a Globally Unique MME Identifier (GUMMEI).

Example 29 includes the subject matter of any one of Examples 25-28, and optionally, wherein the controller is to establish the S1 connection via a transport layer connection between the first eNB and the core network node.

Example 30 includes the subject matter of Example 29, and optionally, wherein the transport layer connection comprises a Stream Control Transmission Protocol (SCTP) connection between the first eNB and the core network node.

Example 31 includes the subject matter of Example 30, and optionally, wherein the controller is to establish the SCTP connection dedicated to the second eNB.

Example 32 includes the subject matter of Example 30, and optionally, wherein the controller is to establish the SCTP connection to communicate between a plurality of second eNBs and the core network node.

Example 33 includes the subject matter of any one of Examples 25-32, and optionally, wherein the X2AP message comprises an X2AP Forward message.

Example 34 includes the subject matter of any one of Examples 25-33, and optionally, comprising one or more antennas, a memory, and a processor.

Example 35 includes a method to be performed at a first Evolved Node B (eNB), the method comprising sending to a second eNB a first message including a core network node discovery request; receiving from the second eNB a second message including a core network node identifier; and establishing an S1 connection between the first eNB and a core network using the core network node identifier.

Example 36 includes the subject matter of Example 35, and optionally, comprising sending the first message upon disconnection of a core network connection the core network.

Example 37 includes the subject matter of Example 35 or 36, and optionally, comprising sending the first message to a plurality of second eNBs; receiving two or more second messages from two or more of the plurality of second eNBs, the two or more second messages including a plurality of core network node identifiers; and establishing the S1 connection with the core network using a selected core network node identifier of the plurality of core network node identifiers.

Example 38 includes the subject matter of any one of Examples 35-37, and optionally, comprising communicating an X2 Application Protocol (X2AP) message between the first eNB and the second eNB, the X2AP message including the core network node identifier and encapsulating an S1 Application Protocol (S1AP) message of the S1 connection between the first eNB and the core network.

Example 39 includes the subject matter of Example 38, and optionally, wherein the X2AP message comprises an X2AP Forward message.

Example 40 includes the subject matter of any one of Examples 35-39, and optionally, wherein the S1 connection is over a transport layer connection.

Example 41 includes the subject matter of Example 40, and optionally, wherein the transport layer connection is a Stream Control Transmission Protocol (SCTP) connection.

Example 42 includes the subject matter of any one of Examples 35-41, and optionally, wherein the core network node identifier comprises a Mobility Management Entity (MME) identifier.

Example 43 includes the subject matter of Example 42, and optionally, wherein the MME identifier comprises an MME Internet Protocol (IP) address, or a Globally Unique MME Identifier (GUMMEI).

Example 44 includes the subject matter of any one of Examples 35-43, and optionally, wherein the first message comprises an X2 Application Protocol (X2AP) backhaul connectivity request, and the second message comprises an X2AP backhaul connectivity response.

Example 45 includes a method to be performed at a first Evolved Node B (eNB), the method comprising receiving core network node discovery request from a second eNB; and sending to the second eNB a response including a core network node identifier representing a core network node.

Example 46 includes the subject matter of Example 45, and optionally, comprising receiving from the first eNB a request to connect to the core network node, and establishing an S1 connection between the second eNB and the core network via the first eNB.

Example 47 includes the subject matter of Example 46, and optionally, comprising communicating an X2 Application Protocol (X2AP) message between the first eNB and the second eNB, the X2AP message including the core network node identifier and encapsulating an S1 Application Protocol (S1AP) message of the S1 connection between the second eNB and the core network; and communicating the S1AP message with the core network over a transport layer connection between the first eNB and the core network node.

Example 48 includes the subject matter of Example 47, and optionally, wherein the transport layer connection comprises a Stream Control Transmission Protocol (SCTP) connection between the first eNB and the core network node.

Example 49 includes the subject matter of Example 48, and optionally, comprising establishing the SCTP connection dedicated to the second eNB.

Example 50 includes the subject matter of Example 48, and optionally, comprising establishing the SCTP connection to communicate between a plurality of second eNBs and the core network node.

Example 51 includes the subject matter of any one of Examples 47-50, and optionally, wherein the X2AP message comprises an X2AP Forward message.

Example 52 includes the subject matter of Example 45 or 46, and optionally, wherein the core network node identifier comprises an address of the first eNB.

Example 53 includes the subject matter of Example 52, and optionally, comprising receiving an S1 Application Protocol (S1AP) setup message from the second eNB, the S1AP setup message addressed to the first eNB; setting up an S1 connection between the first eNB and the second eNB; mapping the S1 connection to a Stream Control Transmission Protocol (SCTP) connection between the first eNB and a Mobility Management Entity (MME) of the core network; communicating an S1AP message with the second eNB over the S1 connection; and communicating the S1AP message with the MME via the SCTP connection.

Example 54 includes the subject matter of Example 53, and optionally, comprising establishing the SCTP connection dedicated to the second eNB.

Example 55 includes the subject matter of Example 53, and optionally, comprising establishing the SCTP connection to communicate between a plurality of second eNBs and the core network node.

Example 56 includes the subject matter of any one of Examples 45-55, and optionally, wherein the core network node identifier comprises a Mobility Management Entity (MME) identifier.

Example 57 includes a method to be performed at a first Evolved Node B (eNB), the method comprising establishing an S1 connection between a second eNB and a core network node of a core network via the first eNB; and communicating an X2 Application Protocol (X2AP) message between the first eNB and the second eNB, the X2AP message including a core network node identifier of the core network node and encapsulating an S1AP message of the S1 connection between the second eNB and the core network node.

Example 58 includes the subject matter of Example 57, and optionally, comprising receiving from the second eNB a core network node discovery request, and sending to the second eNB a response including a core network node identifier of the core network node.

Example 59 includes the subject matter of Example 58, and optionally, wherein the core network node identifier comprises a Mobility Management Entity (MME) identifier.

Example 60 includes the subject matter of Example 59, and optionally, wherein the MME identifier comprises an MME Internet Protocol (IP) address, or a Globally Unique MME Identifier (GUMMEI).

Example 61 includes the subject matter of any one of Examples 57-60, and optionally, comprising establishing the S1 connection via a transport layer connection between the first eNB and the core network node.

Example 62 includes the subject matter of Example 61, and optionally, wherein the transport layer connection comprises a Stream Control Transmission Protocol (SCTP) connection between the first eNB and the core network node.

Example 63 includes the subject matter of Example 62, and optionally, comprising establishing the SCTP connection dedicated to the second eNB.

Example 64 includes the subject matter of Example 62, and optionally, comprising establishing the SCTP connection to communicate between a plurality of second eNBs and the core network node.

Example 65 includes the subject matter of any one of Examples 57-64, and optionally, wherein the X2AP message comprises an X2AP Forward message.

Example 66 includes a product including one or more tangible computer-readable non-transitory storage media comprising computer-executable instructions operable to, when executed by at least one computer processor, enable the at least one computer processor to implement a method at a first Evolved Node B (eNB), the method comprising sending to a second eNB a first message including a core network node discovery request; receiving from the second eNB a second message including a core network node identifier; and establishing an S1 connection between the first eNB and a core network using the core network node identifier.

Example 67 includes the subject matter of Example 66, and optionally, wherein the method comprises sending the first message upon disconnection of a core network connection the core network.

Example 68 includes the subject matter of Example 66 or 67, and optionally, wherein the method comprises sending the first message to a plurality of second eNBs; receiving two or more second messages from two or more of the plurality of second eNBs, the two or more second messages including a plurality of core network node identifiers; and establishing the S1 connection with the core network using a selected core network node identifier of the plurality of core network node identifiers.

Example 69 includes the subject matter of any one of Examples 66-68, and optionally, wherein the method comprises communicating an X2 Application Protocol (X2AP) message between the first eNB and the second eNB, the X2AP message including the core network node identifier and encapsulating an S1AP message of the S1 connection between the first eNB and the core network.

Example 70 includes the subject matter of Example 69, and optionally, wherein the X2AP message comprises an X2AP Forward message.

Example 71 includes the subject matter of any one of Examples 66-70, and optionally, wherein the S1 connection is over a transport layer connection.

Example 72 includes the subject matter of Example 71, and optionally, wherein the transport layer connection is a Stream Control Transmission Protocol (SCTP) connection.

Example 73 includes the subject matter of any one of Examples 66-72, and optionally, wherein the core network node identifier comprises a Mobility Management Entity (MME) identifier.

Example 74 includes the subject matter of Example 73, and optionally, wherein the MME identifier comprises an MME Internet Protocol (IP) address, or a Globally Unique MME Identifier (GUMMEI).

Example 75 includes the subject matter of any one of Examples 66-74, and optionally, wherein the first message comprises an X2 Application Protocol (X2AP) backhaul connectivity request, and the second message comprises an X2AP backhaul connectivity response.

Example 76 includes a product including one or more tangible computer-readable non-transitory storage media comprising computer-executable instructions operable to, when executed by at least one computer processor, enable the at least one computer processor to implement a method at a first Evolved Node B (eNB), the method comprising receiving core network node discovery request from a second eNB; and sending to the second eNB a response including a core network node identifier representing a core network node.

Example 77 includes the subject matter of Example 76, and optionally, wherein the method comprises receiving from the first eNB a request to connect to the core network node, and establishing an S1 connection between the second eNB and the core network via the first eNB.

Example 78 includes the subject matter of Example 77, and optionally, wherein the method comprises communicating an X2 Application Protocol (X2AP) message between the first eNB and the second eNB, the X2AP message including the core network node identifier and encapsulating an S1AP message of the S1 connection between the second eNB and the core network; and communicating the S1AP message with the core network over a transport layer connection between the first eNB and the core network node.

Example 79 includes the subject matter of Example 78, and optionally, wherein the transport layer connection comprises a Stream Control Transmission Protocol (SCTP) connection between the first eNB and the core network node.

Example 80 includes the subject matter of Example 79, and optionally, wherein the method comprises establishing the SCTP connection dedicated to the second eNB.

Example 81 includes the subject matter of Example 79, and optionally, wherein the method comprises establishing the SCTP connection to communicate between a plurality of second eNBs and the core network node.

Example 82 includes the subject matter of any one of Examples 78-81, and optionally, wherein the X2AP message comprises an X2AP Forward message.

Example 83 includes the subject matter of Example 76 or 77, and optionally, wherein the core network node identifier comprises an address of the first eNB.

Example 84 includes the subject matter of Example 83, and optionally, wherein the method comprises receiving an S1 Application protocol (S1AP) setup message from the second eNB, the S1AP setup message addressed to the first eNB; setting up an S1 connection between the first eNB and the second eNB; mapping the S1 connection to a Stream Control Transmission Protocol (SCTP) connection between the first eNB and a Mobility Management Entity (MME) of the core network; communicating an S1AP message with the second eNB over the S1 connection; and communicating the S1AP message with the MME via the SCTP connection.

Example 85 includes the subject matter of Example 84, and optionally, wherein the method comprises establishing the SCTP connection dedicated to the second eNB.

Example 86 includes the subject matter of Example 84, and optionally, wherein the method comprises establishing the SCTP connection to communicate between a plurality of second eNBs and the core network node.

Example 87 includes the subject matter of any one of Examples 76-86, and optionally, wherein the core network node identifier comprises a Mobility Management Entity (MME) identifier.

Example 88 includes a product including one or more tangible computer-readable non-transitory storage media comprising computer-executable instructions operable to, when executed by at least one computer processor, enable the at least one computer processor to implement a method at a first Evolved Node B (eNB), the method comprising establishing an S1 connection between a second eNB and a core network node of a core network via the first eNB; and communicating an X2 Application Protocol (X2AP) message between the first eNB and the second eNB, the X2AP message including a core network node identifier of the core network node and encapsulating an S1 Application Protocol (S1AP) message of the S1 connection between the second eNB and the core network node.

Example 89 includes the subject matter of Example 88, and optionally, wherein the method comprises receiving from the second eNB a core network node discovery request, and sending to the second eNB a response including a core network node identifier of the core network node.

Example 90 includes the subject matter of Example 89, and optionally, wherein the core network node identifier comprises a Mobility Management Entity (MME) identifier.

Example 91 includes the subject matter of Example 90, and optionally, wherein the MME identifier comprises an MME Internet Protocol (IP) address, or a Globally Unique MME Identifier (GUMMEI).

Example 92 includes the subject matter of any one of Examples 88-91, and optionally, wherein the method comprises establishing the S1 connection via a transport layer connection between the first eNB and the core network node.

Example 93 includes the subject matter of Example 92, and optionally, wherein the transport layer connection comprises a Stream Control Transmission Protocol (SCTP) connection between the first eNB and the core network node.

Example 94 includes the subject matter of Example 93, and optionally, wherein the method comprises establishing the SCTP connection dedicated to the second eNB.

Example 95 includes the subject matter of Example 93, and optionally, wherein the method comprises establishing the SCTP connection to communicate between a plurality of second eNBs and the core network node.

Example 96 includes the subject matter of any one of Examples 88-95, and optionally, wherein the X2AP message comprises an X2AP Forward message.

Example 97 includes an apparatus of cellular communication, the apparatus comprising means for sending from a first Evolved Node B (eNB) to a second eNB a first message including a core network node discovery request; means for receiving from the second eNB a second message including a core network node identifier; and means for establishing an S1 connection between the first eNB and a core network using the core network node identifier.

Example 98 includes the subject matter of Example 97, and optionally, comprising means for sending the first message upon disconnection of a core network connection the core network.

Example 99 includes the subject matter of Example 97 or 98, and optionally, comprising means for sending the first message to a plurality of second eNBs; receiving two or more second messages from two or more of the plurality of second eNBs, the two or more second messages including a plurality of core network node identifiers; and establishing the S1 connection with the core network using a selected core network node identifier of the plurality of core network node identifiers.

Example 100 includes the subject matter of any one of Examples 97-99, and optionally, comprising means for communicating an X2 Application Protocol (X2AP) message between the first eNB and the second eNB, the X2AP message including the core network node identifier and encapsulating an S1 Application Protocol (S1AP) message of the S1 connection between the first eNB and the core network.

Example 101 includes the subject matter of Example 100, and optionally, wherein the X2AP message comprises an X2AP Forward message.

Example 102 includes the subject matter of any one of Examples 97-101, and optionally, wherein the S1 connection is over a transport layer connection.

Example 103 includes the subject matter of Example 102, and optionally, wherein the transport layer connection is a Stream Control Transmission Protocol (SCTP) connection.

Example 104 includes the subject matter of any one of Examples 97-103, and optionally, wherein the core network node identifier comprises a Mobility Management Entity (MME) identifier.

Example 105 includes the subject matter of Example 104, and optionally, wherein the MME identifier comprises an MME Internet Protocol (IP) address, or a Globally Unique MME Identifier (GUMMEI).

Example 106 includes the subject matter of any one of Examples 97-105, and optionally, wherein the first message comprises an X2 Application Protocol (X2AP) backhaul connectivity request, and the second message comprises an X2AP backhaul connectivity response.

Example 107 includes an apparatus of cellular communication, the apparatus comprising means for receiving at a first Evolved Node B (eNB) a core network node discovery request from a second eNB; and means for sending from the first eNB to the second eNB a response including a core network node identifier representing a core network node.

Example 108 includes the subject matter of Example 107, and optionally, comprising means for receiving from the first eNB a request to connect to the core network node, and establishing an S1 connection between the second eNB and the core network via the first eNB.

Example 109 includes the subject matter of Example 108, and optionally, comprising means for communicating an X2 Application Protocol (X2AP) message between the first eNB and the second eNB, the X2AP message including the core network node identifier and encapsulating an S1 Application Protocol (S1AP) message of the S1 connection between the second eNB and the core network; and communicating the S1AP message with the core network over a transport layer connection between the first eNB and the core network node.

Example 110 includes the subject matter of Example 109, and optionally, wherein the transport layer connection comprises a Stream Control Transmission Protocol (SCTP) connection between the first eNB and the core network node.

Example 111 includes the subject matter of Example 110, and optionally, comprising means for establishing the SCTP connection dedicated to the second eNB.

Example 112 includes the subject matter of Example 110, and optionally, comprising means for establishing the SCTP connection to communicate between a plurality of second eNBs and the core network node.

Example 113 includes the subject matter of any one of Examples 109-112, and optionally, wherein the X2AP message comprises an X2AP Forward message.

Example 114 includes the subject matter of Example 107 or 108, and optionally, wherein the core network node identifier comprises an address of the first eNB.

Example 115 includes the subject matter of Example 114, and optionally, comprising means for receiving an S1 Application protocol (S1AP) setup message from the second eNB, the S1AP setup message addressed to the first eNB; setting up an S1 connection between the first eNB and the second eNB; mapping the S1 connection to a Stream Control Transmission Protocol (SCTP) connection between the first eNB and a Mobility Management Entity (MME) of the core network; communicating an S1AP message with the second eNB over the S1 connection; and communicating the S1AP message with the MME via the SCTP connection.

Example 116 includes the subject matter of Example 115, and optionally, comprising means for establishing the SCTP connection dedicated to the second eNB.

Example 117 includes the subject matter of Example 115, and optionally, comprising means for establishing the SCTP connection to communicate between a plurality of second eNBs and the core network node.

Example 118 includes the subject matter of any one of Examples 107-117, and optionally, wherein the core network node identifier comprises a Mobility Management Entity (MME) identifier.

Example 119 includes an apparatus of cellular communication, the apparatus comprising means for establishing at a first Evolved Node B (eNB) an S1 connection between a second eNB and a core network node of a core network via the first eNB; and means for communicating an X2 Application Protocol (X2AP) message between the first eNB and the second eNB, the X2AP message including a core network node identifier of the core network node and encapsulating an S1 Application Protocol (S1AP) message of the S1 connection between the second eNB and the core network node.

Example 120 includes the subject matter of Example 119, and optionally, comprising means for receiving from the second eNB a core network node discovery request, and sending to the second eNB a response including a core network node identifier of the core network node.

Example 121 includes the subject matter of Example 120, and optionally, wherein the core network node identifier comprises a Mobility Management Entity (MME) identifier.

Example 122 includes the subject matter of Example 121, and optionally, wherein the MME identifier comprises an MME Internet Protocol (IP) address, or a Globally Unique MME Identifier (GUMMEI).

Example 123 includes the subject matter of any one of Examples 119-122, and optionally, comprising means for establishing the S1 connection via a transport layer connection between the first eNB and the core network node.

Example 124 includes the subject matter of Example 123, and optionally, wherein the transport layer connection comprises a Stream Control Transmission Protocol (SCTP) connection between the first eNB and the core network node.

Example 125 includes the subject matter of Example 124, and optionally, comprising means for establishing the SCTP connection dedicated to the second eNB.

Example 126 includes the subject matter of Example 124, and optionally, comprising means for establishing the SCTP connection to communicate between a plurality of second eNBs and the core network node.

Example 127 includes the subject matter of any one of Examples 119-126, and optionally, wherein the X2AP message comprises an X2AP Forward message.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A first Evolved Node B (eNB) comprising:
a core network interface to communicate with a core network;
a cellular transceiver to communicate with a User Equipment (UE);
an X2 interface to communicate with at least one second eNB; and
a controller to send to the second eNB a first message including a core network node discovery request upon disconnection of said core network interface from said core network, to receive from the second eNB a second message including a core network node identifier, and to establish an S1 connection between said first eNB and said core network using said core network node identifier.

2. The first eNB of claim 1 comprising one or more antennas, a memory, and a processor.

3. A first Evolved Node B (eNB) comprising:
a cellular transceiver to communicate with a User Equipment (UE);
an X2 interface to communicate with at least one second eNB; and
a controller to send a first message including a core network node discovery request to a plurality of second eNBs, to receive two or more second messages from two or more of said plurality of second eNBs, the two or more second messages including a plurality of core network node identifiers, and to establish an S1 connection between said first eNB and a core network using a selected core network node identifier of said plurality of core network node identifiers.

4. The first eNB of claim 3, wherein said selected core network node identifier comprises a Mobility Management Entity (MME) identifier.

5. A first Evolved Node B (eNB) comprising:
a cellular transceiver to communicate with a User Equipment (UE);
an X2 interface to communicate with at least one second eNB; and
a controller to send to the second eNB a first message including a core network node discovery request, to receive from the second eNB a second message including a core network node identifier, to establish an S1 connection between said first eNB and a core network using said core network node identifier, and to communicate an X2 Application Protocol (X2AP) message between said first eNB and said second eNB, the X2AP message including the core network node identifier and encapsulating an S1 Application Protocol (S1AP) message of said S1 connection between said first eNB and said core network.

6. The first eNB of claim 5, wherein said X2AP message comprises an X2AP Forward message.

7. A first Evolved Node B (eNB) comprising:
a cellular transceiver to communicate with a User Equipment (UE);
an X2 interface to communicate with at least one second eNB; and
a controller to send to the second eNB a first message including a core network node discovery request, to receive from the second eNB a second message including a Mobility Management Entity (MME) identifier, and to establish an S1 connection between said first eNB and a core network using said MME identifier.

8. The first eNB of claim 7, wherein the MME identifier comprises an MME Internet Protocol (IP) address, or a Globally Unique MME Identifier (GUMMEI).

9. A first Evolved Node B (eNB) comprising:
a cellular transceiver to communicate with a User Equipment (UE);
an X2 interface to communicate with at least one second eNB; and
a controller to send to the second eNB a first message including a core network node discovery request, to receive from the second eNB a second message including a core network node identifier, and to establish an S1 connection between said first eNB and a core network using said core network node identifier, wherein said first message comprises an X2 Application Protocol (X2AP) backhaul connectivity request, and said second message comprises an X2AP backhaul connectivity response.

10. A first Evolved Node B (eNB) comprising:
a core network interface to communicate with a core network;
an X2 interface to communicate with at least one second eNB; and
a controller to receive from the second eNB a core network node discovery request, to send to the second eNB a response including a core network node identifier representing a core network node, to receive from said second eNB a request to connect to the core network node, and to establish an S1 connection between said second eNB and said core network via said first eNB.

11. The first eNB of claim 10, wherein said controller is to communicate an X2 Application Protocol (X2AP) message between said first eNB and said second eNB, the X2AP message including said core network node identifier and encapsulating an S1 Application Protocol (S1AP) message of said S1 connection between said second eNB and said core network, said controller to communicate said S1AP message with said core network over a transport layer connection between said first eNB and said core network node.

12. The first eNB of claim 11, wherein said transport layer connection comprises a Stream Control Transmission Protocol (SCTP) connection between said first eNB and said core network node.

13. The first eNB of claim 12, wherein said controller is to establish said SCTP connection to communicate between a plurality of second eNBs and said core network node.

14. The first eNB of claim 10 comprising one or more antennas, a memory, and a processor.

15. A first Evolved Node B (eNB) comprising:
a core network interface to communicate with a core network;
an X2 interface to communicate with at least one second eNB; and
a controller to receive from the second eNB a core network node discovery request, and to send to the second eNB a response including a core network node identifier representing a core network node, said core network node identifier comprises an address of said first eNB.

16. The first eNB of claim 15, wherein said controller is to receive an S1 Application protocol (S1AP) setup message from said second eNB, the S1AP setup message addressed to said first eNB, the controller to setup an S1 connection between said first eNB and said second eNB, to map said S1 connection to a Stream Control Transmission Protocol (SCTP) connection between said first eNB and a Mobility Management Entity (MME) of said core network, to communicate an S1AP message with said second eNB over the S1 connection, and to communicate the S1AP message with the MME via the SCTP connection.

17. A first Evolved Node B (eNB) comprising:
a core network interface to communicate with a core network;
an X2 interface to communicate with at least one second eNB; and
a controller to receive from the second eNB a core network node discovery request, and to send to the second eNB a response including a Mobility Management Entity (MME) identifier.

18. The first eNB of claim 17, wherein said controller is to receive from said second eNB a request to connect to said core network node, said controller to establish an S1 connection between said second eNB and said core network via said first eNB.

19. A method to be performed at a first Evolved Node B (eNB), the method comprising:
establishing an S1 connection between a second eNB and a core network node of a core network via said first eNB; and
communicating an X2 Application Protocol (X2AP) message between said first eNB and said second eNB, the X2AP message including a core network node identifier of said core network node and encapsulating an S1AP message of said S1 connection between said second eNB and said core network node.

20. The method of claim 19 comprising receiving from the second eNB a core network node discovery request, and sending to the second eNB a response including a core network node identifier of said core network node.

21. The method of claim 20, wherein said core network node identifier comprises a Mobility Management Entity (MME) identifier.

22. The method of claim 19 comprising establishing said S1 connection via a transport layer connection between said first eNB and said core network node.

23. A product including one or more tangible computer-readable non-transitory storage media comprising computer-executable instructions operable to, when executed by at least one computer processor, enable the at least one computer processor to implement operations at a first Evolved Node B (eNB), the operations comprising:

sending to a second eNB a first message including a core network node discovery request;

receiving from the second eNB a second message including a core network node identifier;

establishing an S1 connection between said first eNB and a core network using said core network node identifier; and communicating an X2 Application Protocol (X2AP) message between said first eNB and said second eNB, the X2AP message including the core network node identifier and encapsulating an S1AP message of said S1 connection between said first eNB and said core network.

24. The product of claim 23, wherein the operations comprise sending said first message to a plurality of second eNBs; receiving two or more second messages from two or more of said plurality of second eNBs, the two or more second messages including a plurality of core network node identifiers; and establishing the S1 connection with said core network using a selected core network node identifier of said plurality of core network node identifiers.

25. The product of claim 23, wherein the selected core network node identifier comprises a Mobility Management Entity (MME) identifier.

* * * * *